United States Patent Office 3,014,665
Patented Dec. 26, 1961

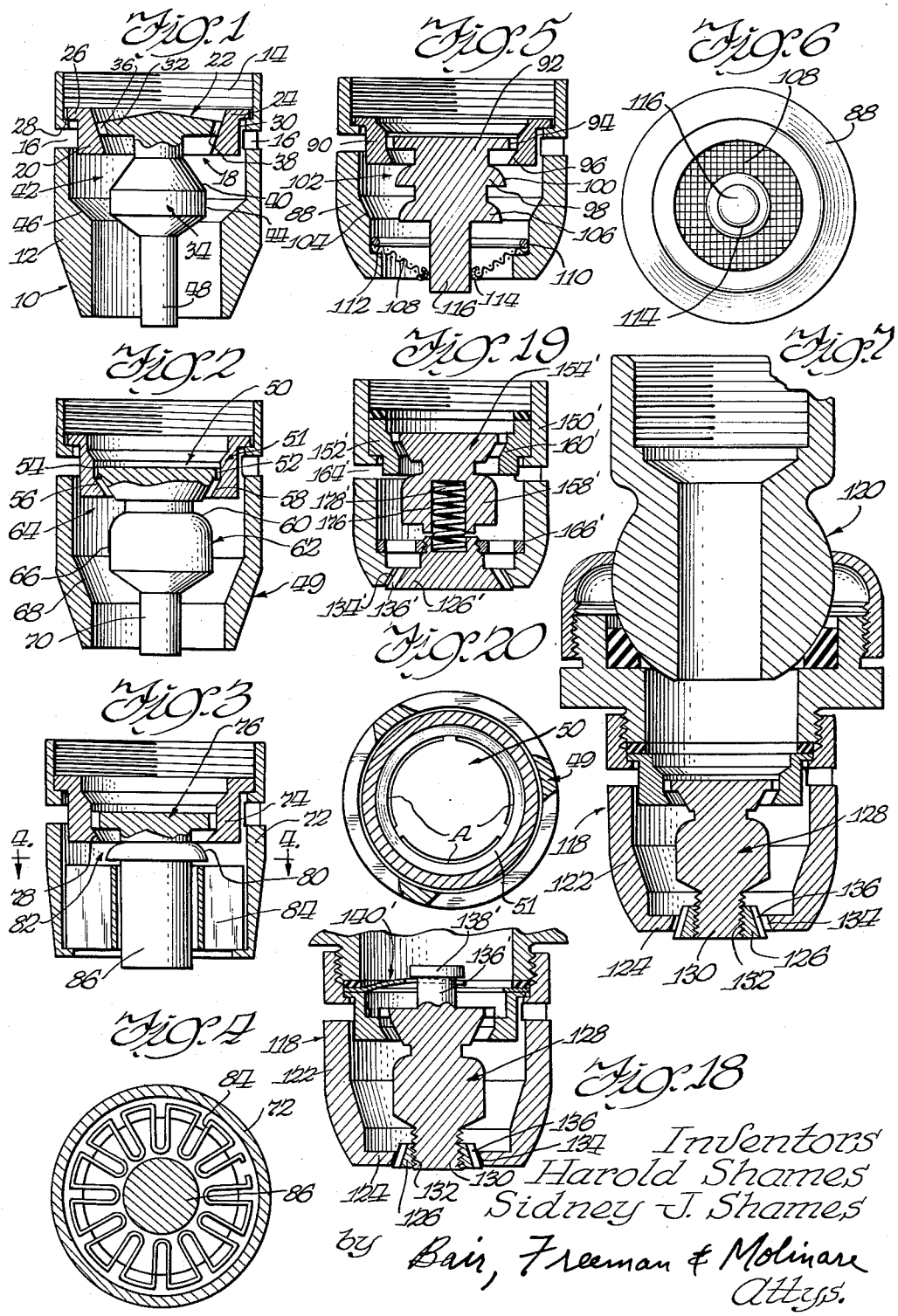

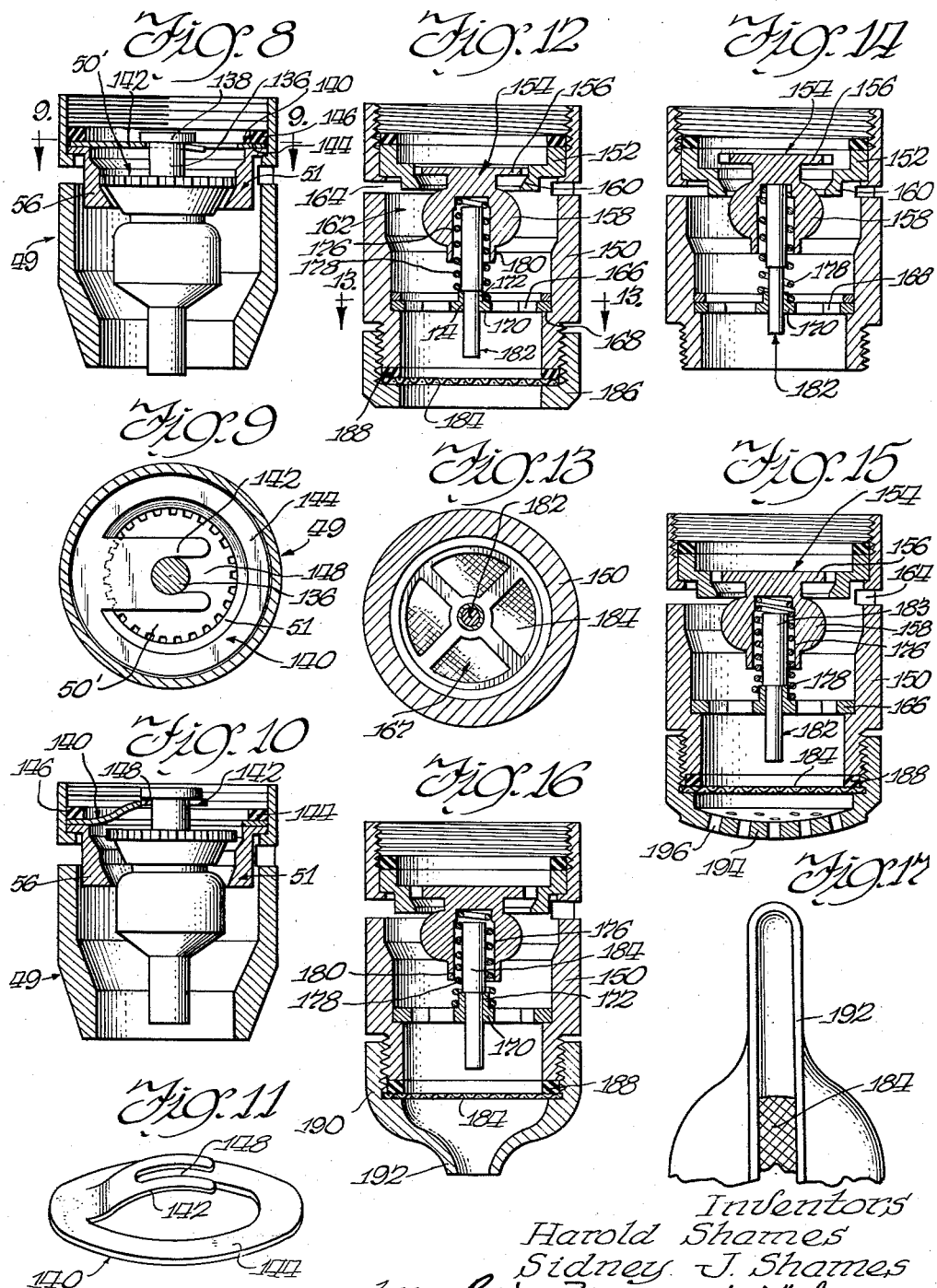

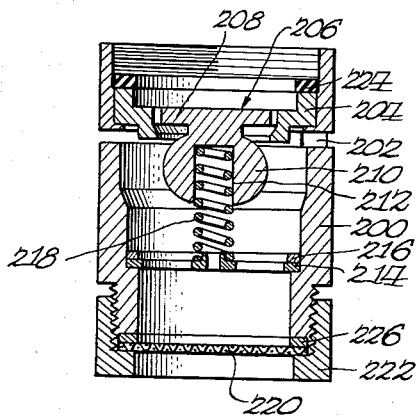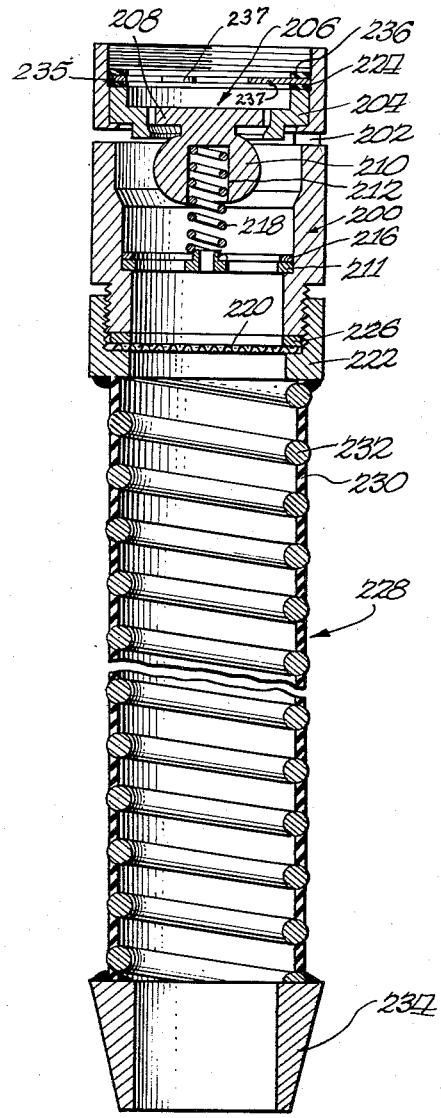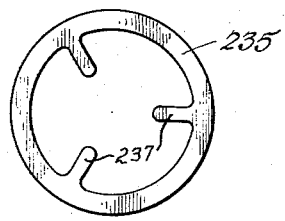

3,014,665
SELF-CLEANING AERATOR
Harold Shames, 1568 Macombs Road, Bronx, N.Y., and Sidney J. Shames, 136—11 68th Drive, Kew Garden Hills, Queens, N.Y.
Filed May 6, 1954, Ser. No. 427,925
2 Claims. (Cl. 239—107)

This application is a continuation-in-part application of our copending application Serial No. 279,984 filed April 2, 1952, now issued as Patent No. 2,707,624 of May 3, 1955.

This invention relates to aerating devices. In particular, this invention is directed to the improvement of an aerating device by including means in the aerating device for assisting in cleaning that portion of the aerator that is most likely to become clogged by dirt.

Heretofore, aerating devices that have been provided for domestic use on water faucets in kitchens and bathrooms have included at least one upstream foraminous metering member, such as a screen, or diaphragm having a plurality of fine perforations therethrough, for initially dividing up the flow of water passing through the aerator into a plurality of high velocity jets, and have included one or more downstream screens. One of the greatest difficulties encountered in the use of aerators of this type is the tendency of the upstream screen or perforated diaphragm to become clogged with the tiny particles of dirt and sand which are carried by the water that is being discharged from the faucet. These tiny particles of dirt and sand may be suspended in the water supply and often are small enough to pass the water filtering system, or they may be picked up as the water passes through the water pipes in the home. In any event, they accumulate on the perforated diaphragm or screen and prevent full, efficient operation of the aerator. As the perforated diaphragm or screen becomes clogged, the amount of water which passes through the aerator is reduced, and in addition undesirable back pressures are built up.

Thus, one object of this invention is to provide an aerator for liquids having liquid metering orifices formed by the mating surfaces of a plurality of separable members, with means for maintaining said orifices free of impurities, whereby there is no reduction in the quantity of liquid flow which the aerator is adapted to accommodate.

Another object of this invention is to provide an aerator for liquids, which aerator is adapted to be cleaned of flow restricting impurities without disassembling said aerator or removing it from its operative environs.

A further object of this invention is to provide an automatically self-cleaning aerator for liquids.

The use of a perforated metering disc or screen for initially dividing the flow of water through the aerator up into a plurality of fine high velocity jets has, recently, been criticized as unsanitary. The essence of the complaint is that after the flow of water is turned off, and when using an aerator, some residue portion of water remains in the aerator upstream of the metering disc or screen and is prevented from running out under the force of gravity because of the surface tension that exists in the film that extends across the perforations, or apertures, in the metering disc or screen. The criticism further contends that bacteria laden air can then enter the aerator through the air ports or through the outlet of the aerator and the interior of the aerator, being damp and having residue water therein, provides an excellent breeding place for a colony of bacteria. The above criticism has been raised particularly with respect to the use of aerators in places where sanitation is of utmost importance, such as in hospitals and schools.

Thus, still an additional object of this invention is to provide an aerator which obviates the above criticism of domestic type aerators.

One of the important factors in the product production potential of the United States is the use of high speed machine tools. All high speed tools have the inherent problems of heat dissipation and length of tool life. These problems have been partially solved by the use of coolants in conjunction with the work-cutting operation of the machine tools, by directing streams of coolants onto the work being machined and onto the tool performing its operation on the work. However, the use of coolants has, itself, given rise to other problems arising from the fact that the coolant splashes off the work or tool and generally results in very sloppy and unsafe floor conditions surrounding the machine. At the same time, these machine tool coolants are quite expensive and it is desirable that the loss of coolant be reduced as much as possible.

Still further, because of the high speed of movement (often rotary) of the work and tool, it is difficult to maintain the surfaces of the work or tool wet with the coolant and the coolants must often be supplied in great quantities and at high speed and pressure.

The supplying of coolant to machine tools in high velocity and high pressure streams further contributes to the splash problem above noted. In addition, the failure of the surface of the work, or of the tool, to remain wet decreases the efficiency of heat dissipation, decreases the efficiency of the cutting action of the tool, and decreases the tool life.

Thus, one object of this invention is to provide a novel and improved method of using machine tools by means of which heat dissipation from the work and from the tool may be increased, the cutting action of the tool may be enhanced, and whereby the life of the machine tool may be increased.

A further object of this invention is to provide a novel and improved method of using machine tools provided with liquid coolant means, by means of which the loss of coolant and sloppy floor conditions surrounding the machine may be substantially eliminated.

Another object of this invention is to provide a novel and improved method of using machine tools provided with liquid coolant means, by means of which the wetting of the work, and of the tool, by the coolant, both as to the actual physical concept of wetting and as to the length of time that the wetting exists, is greatly increased.

The novel and improved method of this invention which accomplishes the objects set forth immediately above comprises the steps of heavily aerating the liquid coolant as it is being discharged onto the surface of the tool or work, so that the coolant contains therein a great multitude of fine air bubbles.

It has been found that when a stream of heavily aerated machine tool coolant is used instead of a stream of ordinary coolant, the amount of coolant splash from the tool and work is very greatly reduced. Correspondingly, the sloppy floor condition around the machine is, to the greater part, prevented and in some instances completely eliminated.

In addition, the presence of the air bubbles in the coolant enhances the wetting action of the coolant and causes a thin film of coolant to cling to the surfaces of the work and of the tool, and the presence of the liquid film thereon greatly increases the heat dissipation from both the tool and the work, and in over-all performance results in enhanced cutting action of the tool and increases the life of the cutting tool. Furthermore, the thin surface film is not as sensitive to centrifugal forces which may be developed by rotating members and the surface tension of the aerated liquid is often sufficient to keep the film of liquid on the surfaces of the tool and of the work despite centrifugal forces to which the film of coolant may be subjected.

However, the passing of machine tool coolants through an aerator poses a serious problem. In general, the aeration of any recirculating liquid poses the problem of clogging, or fouling, of the aerator by the dirt the liquid picks up as it comes in contact with dirt, or that is picked up through the medium of dirt laden air that is aspirated into the aerator and is intimately mixed with the liquid that is later recirculated. Machine tool coolants, because of their expensiveness, are usually recaptured and recirculated through the machine. It is inherent that the coolant will have therein, in addition to dirt acquired from the dust laden air, fine chips, or shavings, from the work being operated on by the machine tool.

Thus, another object of this invention is to provide a novel and improved aerator for use with liquids that are recirculated through the aerator, which aerator is provided with means for cleaning the aerator without disassembling the aerating mechanism within the aerator.

Further objects and advantages of this invention will become apparent as the following description proceeds and the features of novelty which characterize this invention will be pointed out with particularity in the claims annexed to and forming part of this specification.

Preferred embodiments of the invention are shown in the accompanying drawings, in which:

FIGURE 1 is a cross-section view of one form of our aerator including means for obtaining improved dispersal and mixing of liquid and air, and improved means for straightening the flow of aerated liquid, and also provides means, including a movable member carrying a manually engageable stem, for the cleaning of the liquid flow metering, or restricting orifices;

FIGURE 2 is a cross-section view of another form of our aerator which includes many of the features shown in FIGURE 1 and also shows a modified construction of the liquid flow controlling members;

FIGURE 3 is a cross-section view of another modified form of our aerator of FIGURE 1 showing another means for straightening the flow of the aerated liquid, which means also cooperates with the stem of the movable member to restrict lateral movement thereof;

FIGURE 4 is a cross-section view taken on line 4—4 of FIGURE 3;

FIGURE 5 is a cross-section view of another modified form of our aerator, showing a screen at the outlet end of the aerator and being provided with a manually engageable member, or stem, extending through the screen which affords means for cleaning of the liquid flow metering, or restricting, orifices;

FIGURE 6 is a view looking upward into the aerator shown in FIGURE 5;

FIGURE 7 is a cross-section view of an adaptation of our novel aerator to a shower head and being provided with means affording manual manipulation of portions of the aerator for cleaning the upstream metering orifices of the aerating mechanism;

FIGURE 8 is a cross-section view of a modified form of our aerator, similar in many respects to that shown in FIGURE 2, which aerator is equipped with means affording self-cleaning of the liquid flow metering orifices, and for automatically permitting drainage of substantially all of the residue water from the aerator after the flow of water through the aerator has been terminated;

FIGURE 9 is a cross-section view taken on line 9—9 of FIGURE 8;

FIGURE 10 is another view of the aerator shown in FIGURE 8 showing one of the flow controlling members in displaced position to afford cleaning of the flow controlling orifices;

FIGURE 11 is an isometric view of the spring used in the self-cleaning aerator shown in FIGURES 8–10;

FIGURE 12 is a cross-section view of the modified form of the self-cleaning aerator shown in FIGURE 8, this figures showing the position of the parts when liquid is flowing therethrough, and this aerator being additionally provided with a splash reducing means, in the form of a screen, at its outlet end;

FIGURE 13 is a cross-section view taken substantially on line 13—13 of FIGURE 12;

FIGURE 14 is a cross-section view of a portion of the self-cleaning aerator of FIGURE 12, showing portions of the aerator mechanism in position for flushing out the metering orifices and means for maintaining said portions of aerator in the flushing-out position even when water is flowing therethrough;

FIGURE 15 is a cross-section view of an aerating device having the self-cleaning features shown in FIGURE 12 and being provided at its outlet end with means for discharging the aerated liquid in a plurality of discrete aerated streams;

FIGURE 16 is a cross-section view of an aerating device similar to that shown in FIGURE 12 but provided with a flared discharge nozzle for discharging the aerated water in a stream of a predetermined shape substantially different from the shape of the discharge stream in FIGURE 12, and which discharge stream shape is of very great length compared to its width;

FIGURE 17 is a fragmentary bottom view of the aerator shown in FIGURE 16 and is taken looking upwardly toward the aerator shown in FIGURE 16;

FIGURE 18 is a cross-section view of the shower head of FIGURE 7 provided with the self-cleaning features shown in FIGURE 8;

FIGURE 19 is a cross-section view of the shower head of FIGURE 7 provided with the self-cleaning features shown in FIGURE 12;

FIGURE 20 is a top-plan view of a modified form of gear disc carried by the plug member of the aerator.

FIGURE 21 is a cross-section view of a commercial form of the self-cleaning aerator;

FIGURE 22 is a cross-section view showing the aerator of FIGURE 21 provided with a stop-washer adapted to engage the plug member and provided with a flexible hose at the outlet end which affords means for directing the aerated fluid to wherever it is desired; and FIGURE 23 is a plan view of the stopwasher shown in FIGURE 22.

Referring now to the drawings, there is shown in FIGURE 1 an aerator generally indicated at 10. This aerator includes a cylindrical barrel 12, the upstream end of which is threaded as at 14 to afford connection of the aerator to the outlet end of the fluid carrying member (such as shown in FIGURE 7). The wall of cylindrical barrel 12 has a plurality of air inlets 16 therethrough. A flow controlling means generally indicated by numeral 18 is positioned within the barrel 12. The flow control means includes the annular ring 20 and a plug member 22.

The annular ring 20 has a conical bore 24 therethrough and is provided at its upper end with an annular outwardly extending flange 26 adapted to seat on shoulder 28 formed within the barrel 12. The outer cylindrical wall 30 of the annular ring 20 is spaced concentrically from the inner surface of the barrel 12 at a point generally opposite air inlets 16, although it is not necessary that this opposed relationship between wall 30 and air inlets 16 be maintained, it having been found that aerators of this invention will operate satisfactorily even when air inlets 16 are positioned in a plane beneath the lower terminal edge of the annular ring 20.

The plug member 22 includes a flow control portion 32 and a splash portion, or member, 34. The flow control portion 32 has bevel teeth 36 formed therein adapted to mate with the wall of tapered bore 24 to form orifices, or liquid flow control passageways 38. The wall of the tapering bore 24 and the teeth 36 bound passageways 38 which converge axially inwardly and in a downstream direction.

The splash member 34 has splash surfaces 40 against which the liquid is directed after it passes through fluid passageways 38. The water impinges against 40 and rebounds generally laterally outwardly, primarily in directions transverse to the axis of the aerator. This splashing takes place in the portion of the chamber surrounded by the casing and generally indicated at 42, and is known as the aeration chamber 42. It is within the aeration chamber 42 that the commingling of liquid and air aspirated through air inlet 16 takes place. Thereafter, the mixed air and liquid passes out through the lower end of the barrel.

As the flow passes downstream from the aeration chamber 42, it is straightened out by reason of certain structural features. This straightening of flow is achieved by first constricting a portion of the annular flow passageway downstream of the aeration chamber 42 and then permitting the downstream portion of the annular flow passageway to enlarge. To achieve this end the plug member 22 is provided with a cylindrical portion 44 extending downstream of the lower edge of the splash surface 40, while the inner wall of the surrounding portion of the barrel 12 is tapered inwardly over a portion of the axial length, as shown at 46. Thereafter, the plug member 24 is reduced in diameter to form the downwardly depending stem 48 which lies concentrically within the barrel 12. The cylindrical portion 44 of the plug member 22 and the inwardly tapering wall 46 of the surrounding portion of the barrel 12 cooperate to provide an annular passageway which, extending downstream from the aeration chamber 42, first becomes constricted and later expands. It is by this simple expedient that straightening of the flow of aerated liquid is obtained as the liquid leaves the aeration chamber 42.

The downwardly depending stem 48 extends below the lower edge of the barrel 12 and is adapted to be manipulated by a person's finger so as to be displaced upwardly to separate the teeth 36 of flow control member 22 from the wall of bore 24. This results in greatly enlarging the passageways 38 between these two members and permits flushing out of the impurities that may clog said liquid flow passageways.

In the aerator shown in FIGURE 2, many of the features are similar to those shown in FIGURE 1. There is a casing 49, a guide ring 51 and a plug member 50. In the form shown in FIGURE 2, the plug member 50 is equipped with cylindrical gear teeth 52 and the portion 54 of the bore through the annular ring member 51 which cooperates with cylindrical teeth 52 is also formed cylindrical. Downstream of the ring portion 54, the bore portion 56 through the ring 51 is conical and tapers axially inwardly. The teeth 52 of the central plug 50 engage the upper edge of the conical bore portion 56 of the ring 51 and in that way the plug 50 is prevented from passing downstream through the guide ring 51.

The inwardly tapered bore portion 56 of the guide ring serves to direct the fluid conically inwardly onto the splash surfaces 60 of the splash member 62 positioned therebelow. The splash surfaces 60 of the splash member 62 are curved convexly and when the fluid strikes surfaces 60 it rebounds and is dispersed laterally in directions transverse to the axis of the aerator into the aerating chamber generally indicated at 64, where mixing of the dispersed liquid and air takes place. Thereafter, the mixture of liquid and air in passing downstream through the aerator, passes through a constricted passageway formed between the cylindrical portion 66 of the member 62 and the inwardly tapering wall 68 of the aerator barrel, in a manner as set forth in the description of FIGURE 1. A downwardly depending stem 70 of the plug member 50 affords means for unseating the plug member 50 from the guide ring 51 so as to permit flushing out of the liquid passageways formed between teeth 52 and the bore wall 54.

In the aerator shown in FIGURE 3, the straightening out of the flow of aerated liquid is achieved by means of a corrugated member positioned in the barrel of the aerator downstream of the aerating chamber. In FIGURE 3, the barrel is indicated at 72, the annular guide ring at 74, and the plug member at 76. The flow of liquid is directed by conical surface 78 of the guide ring 74 onto the splash surfaces 80 of the plug member 76. The splashed fluid is directed into the aeration chamber 82 where thorough mixing of the water with the aspirated air takes place. Downstream of splash surfaces 80 is positioned a member 84 which has portions thereof bent back upon themselves to form a plurality of radially disposed walls which extend axially of the barrel and divide the passageway into a plurality of axially extending segments. The axially extending walls of member 84 serve to straighten the flow. In addition, the radially inward portions of the member 84 are positioned closely adjacent the stem member 86 of plug member 76 and cooperate with the stem member 86 to restrict lateral movement of said stem member. The plug member 76 may be manually manipulated through means of the stem 86 in the manner as described above with respect to FIGURES 1 and 2, thereby permitting the opening of the metering passageways formed between the teeth of the plug member 86 and the bore of the guide ring 74 for the purposes of flushing out said metering passageways.

In the aerator illustrated in FIGURE 5, there is a barrel 88, an annular guide ring 90, and a plug member 92. The annular guide ring 90 and the upper portion of the plug member 92 are similar in many respects to the annular guide ring and corresponding part of the plug member illustrated in FIGURE 3. The plug member 92 is provided with teeth 94 which cooperate with adjacent surfaces of the annular guide ring 90 to form passageways for metering the flow of liquid and the annular guide ring 90 is provided with conical fluid directing surfaces 96 located downstream of said flow metering passageways.

The lower portion of plug member 92 in FIGURE 5, is different from the lower portion of the plug members of any of the aerators previously described. The plug member 92 includes an upper umbrella-shaped portion 98 having a convexly curved surface 100 which serves as a splash surface. The liquid directed by the conical surfaces 96 impinge upon and rebound from the splash surfaces 100 into the aeration chamber, or region, 102, where mixing of the liquid and aspirated air takes place. Thereafter, as the aerated liquid passes downstream it passes a constriction formed by the tapering inner surface 104 of the barrel and a lower umbrella-shaped portion 106 formed integral with the plug member 92. After the aerated liquid passes the constriction in the flow passageways, the aeration chamber enlarges in area, as in the other forms earlier described.

The aerator shown in FIGURE 5 is also equipped with a screen 108 at the outlet end of the barrel which is secured in position by means of which ring 110, which clamps the screen 108 against a shoulder 112, formed adjacent the outlet end of the barrel. The screen 108 has a central aperture 114 therein through which extends the downwardly depending stem 116 of the plug member 92. The downwardly depending stem 116 extends below the lower end of the aerated barrel and affords means for manipulating the plug member 92 upwardly so as to unseat the teeth 94 from the annular guide ring 90, thus enlarging the flow metering passageways formed therebetween so as to permit flushing out of any impurities that may tend to clog said flow passageways. The screen 108 slopes downwardly toward its central portion so that dirt and other impurities that do not pass through the screen fall, or roll, down hill toward the central aperture 114 through which they may pass.

In FIGURE 7, there is illustrated an adaptation of our novel aerator to a shower head, the shower head is generally indicated at 118 and has a ball connection to a source of fluid generally indicated at 120, which ball connection permits pivoting of the shower head in a multitude of directions. The aerator shown in FIGURE 7 is similar to that illustrated in FIGURE 2, except that the downstream end of the barrel 122 is partially closed off by flange member 124 and by flow directing member 126 which is attached to the plug member 128 of the aerator. The plug member 128 of the aerator has a downwardly depending stem 130 which is threaded as at 132.

The end flange 124 is provided with a tapering edge 134; and the flow directing member 126 is provided with cooperating bevel teeth 136. The bevel teeth 136 cooperate with the tapered edge 134 to form shower stream flow passageways therebetween. The tapering of the edge 134 and the bevel teeth 136 to provide direction to the aerated stream as it leaves the shower head. The stream is aerated prior to its passing the passageways formed between surface 134 and teeth 136. The flow directing member 126 is formed separate from the plug member 128 so that the entire arrangement may be assembled. The flow directing member 126 is threaded to stem 130 and it can be seen that adjustment in the size of the shower stream may be provided by adjusting the axial position of the flow directing member 126 on stem 132.

Suitable modification may be made in the flow directing member 126 and flange 124, such as increasing the clearance therebetween, or by varying the slope of the cooperating edges therebetween, to accommodate axial movement of the plug member 128 within the shower head. It is also contemplated, as a modification of the structure shown, that the edge of flange 124 may be provided with teeth which cooperate with a cylindrical or conical surface of member 126 to form the shower stream flow passageways therebetween.

The fact that the stem 130 and the flow directing member 126 extend below the lower terminal edge of the barrel 122 permits manual manipulation of the plug member 128 to a position separating the gear teeth of the plug member from the cooperating surfaces of the supporting guide ring so as to open the passageways formed between said gear teeth and said guide ring so as to permit flushing out of said flow control passageways.

In the aerator shown in FIGURE 8, there is a casing 49, a guide ring 51 and a plug member 50'. The plug member 50' is provided with an upstanding stud 136 with an enlarged head 138 thereon. A spring member 140 having a bifurcated cantilever arm 142 engaging the underside of head 138 provides means for automatically lifting the plug member away from its seat in the annular guide ring, so that flushing out of the liquid flow passageways is achieved. The spring is so designed that when a predetermined liquid pressure is imposed on the upstream surfaces of the plug member, then the plug member is seated in the operating position shown in FIGURE 8 and when the liquid pressure is removed from the plug member, then the plug member is lifted to the position shown in FIGURE 10. By this simple arrangement, the aerator is self-cleaning because when the flow of liquid is shut down the plug member is always moved to a position where flushing out of the passageways will take place.

FIGURE 9 shows the gear disc portion of plug member 50' and shows the arrangement of gear teeth at the edge of the disc, which teeth cooperate with a cylindrical bore in the guide ring 51 for defining metering passageways for metering the flow of liquid through the aerator. The use of a gear disc providing gear teeth for cooperating with the guide ring for defining flow metering passageways is used in all of the forms of aerators illustrated herein.

The spring member 140 includes a ring portion 144 which is supported on the guide ring of the aerator and which is adapted to have positioned thereon a rubber sealing washer 146. The elongated slot 148 of the bifurcated cantilever arm 142 is of such a length as to provide for lateral movement between the bifurcated arm 142 and the stud 136 of the plug member, as the bifurcated arm 142 is distorted from the position in FIGURE 10 to the position in FIGURE 8.

In the aerator shown in FIGURE 12, there is provided a casing 150, an annular guide ring 152, and a central plug member 154 having an upper gear disc portion 156 and a ball portion 158 depending therefrom. The gear disc 156 cooperates with the guide ring 152 to define fluid metering passageways therebetween. The guide ring 152 is also provided with conical guide surface 160 for directing the flow of liquid conically inwardly onto the rounded surface of the ball member 158 from whence the liquid rebounds into the aeration chamber 162 wherein the fluid is intimately mixed with air aspirated into the casing through air inlets 164. Downstream of the ball member 158 there is positioned a support member, or spider, 166 which is supported on a shoulder formed in the wall of casing 150. The spider 166 has a central hub portion 170 having a boss 172 thereon and a vertical bore 174 through said hub portion 170 and through said boss portion 172.

There is formed on the underside of the ball member 158 a central recess 176. A helical spring 178 is positioned between the spider 166 and the plug member 154. In particular, the spring 178 is positioned on the spider for fitting over the boss 172 with the upper end of the helical spring entering the recess 176 and engaging the plug member 154. The helical spring 178 is formed of such length and has such a spring constant that when there is no liquid passing through the aerator, then the plug member 154 is moved to the position shown in FIGURE 14 where the flow metering passageways are opened. When liquid is passing through the aerator the pressure of liquid is operative to compress the helical spring 178 and to move the plug member downwardly to the position shown in FIGURE 12, wherein the flow passageways between the gear disc 156 and the guide ring 152 are reformed so that the aerator operates.

The movement of the plug member 154 to the position in FIGURE 14 is operative to dislodge dirt that may accumulate between the teeth of the gear disc and the wall of guide ring 152, and in addition, upon the initial flow of liquid through the aerator, said initial flow is operative to flush out the dirt from the fluid metering passageways.

The ball member 158 is provided with a downwardly depending flange 180 which extends around the edge of the recess 176. The purpose of flange 180 is to further assure alignment between the helical spring 178 and the plug member 154 and to keep foreign matter out.

The spider 166 carries in the bore 174 therethrough, a manually operable stem member 182. The upper portion 183 of the stem member 182 is enlarged so that it will seat upon boss 172 and thus the stem member 182 is retained in position on the spider 166. The upper portion 183 of the stem member is positioned substantially concentrically within the helical coil 178. The stem member and the wall of the recess 176 cooperate to define an annular space within which the helical coil 178 is positioned. The other purpose of stem 182 is that when the lower end of the aerator is open and accessible therethrough, as shown in FIGURE 14, the stem 182 may be manually lifted to the position shown in FIGURE 14, where the upper terminal edge of the stem 182 engages plug member 154 and maintains the plug member 154 in the elevated position against the pressure of liquid that may be passing through the aerator.

The use of the stem 182 is optional in flushing out the aerator's flow metering passageways. There are certain benefits obtained by using stem 182, rather than using the spring-type self-cleaning features. In order to insure flushing out of the fluid flow passageways, the plug member 154 may be manually maintained in the elevated position by means of stem 182, as shown in FIGURE 14, and then the flow is initiated through the aerator. The pressure of the fluid passing the edges of the gear disc 156 and passing through the bore in the guide ring 152 is operative to clean off the flow defining edges and thus insures the flushing out of the flow passageways. The dirt and debris are carried by the liquid downwardly through the apertures 167 in the spider 166 and out from the discharge end of the aerator.

While the stem 182 is shown as separate and apart from the plug member 154, it will be appreciated that the stem member 182 may be formed integral with, or connected directly to, the plug member 154 in any appropriate manner, and thus the stem member 182 may be movable with the plug member 154 rather than being separate from the plug member, as shown in FIGURES 12–14.

The outlet end of the aerator shown in FIGURE 12 is provided with a screen 184 which is retained in position by means of an annular ring 186 which is removably threaded to the lower end of the casing 150. An appropriate rubber seal, or washer, 188 may be provided between the screen 184 and the lower terminal edge of the casing 150. The aerator may be used either with the screen 184, as shown in FIGURE 12, or without the screen, as shown in FIGURE 14. In order to manually operate the stem 182 in the manner described above, it is necessary where the screen 184 and ring 186 are used to remove said members so as to obtain access to the stem 182, as shown in FIGURE 14.

The aerator shown in FIGURE 16 is substantially the same as the aerator shown in FIGURES 12 and 14 except that the outlet end of the aerator is provided with means for delivering the aerated stream in a stream of a particular cross section. These means include an annular ring portion 190 adapted to be threaded to the lower end of the casing 150 and which also serves to retain the screen 184 in position. Downstream of the screen 184 the means are shaped to define a discharge aperture of very great length as compared with the width, as best seen in FIGURE 7. This discharge shape may be referred to as a fish-tail 192. The primary purpose of such a shape is to deliver an aerated stream of relatively greater length as compared with the diameter of the aerator casing.

In the aerator shown in FIGURE 15, the aerating device is adapted to deliver aerated streams in a large plurality of distinct and separate aerated streams. For that purpose there is provided a transverse portion 194 which extends across the outlet of the aerator and which has a plurality of bores 196 therethrough. The axes of bores 196 are generally axially converging upstream of the transverse portion 194 and thus the aerator of FIGURE 15 delivers a plurality of divergent aerated streams. The form of the aerator shown in FIGURE 15 could be used as an aerated shower head or aerated spray. The total area of the bores 196 should be so related to the inside cross-section area of the casing 150 such that no undesirable back pressure is built up in the aerator which would destroy the aerating operation of the aerator. In other words, the size of the bores 196 should be of such size as to accommodate the entire flow of aerated liquid which is being produced by the aerator upstream of the transverse portion 194.

In FIGURE 18 there is shown a shower head similar to that shown in FIGURE 7 provided with the self-cleaning mechanism of FIGURES 8–11.

FIGURE 19 shows a shower head similar to that shown in FIGURE 7 provided with the self-cleaning mechanism of FIGURES 12–14. It will be seen in FIGURE 19 that it is not necessary for the guide ring 152 to extend below the air ports 164.

While one form of the flow metering passageway is shown herein in FIGURE 9, other forms of flow metering passageways may also be used wherein cooperating portions of the plug member and guide ring define the flow passageways. One such modified form of flow passageway is shown herein in FIGURE 20 where, for example, three (3) flow metering passageways A of arcuate extent are provided.

FIGURE 21 shows a commercial model of self-cleaning aerator that has proved to be very successful in actual operations. Briefly, the aerator of FIGURE 21 includes a casing, or barrel, 200, having air ports 202 therein, the combination guide and support ring 204, the plug member 206 having gear disc 208 and depending ball 210, said ball having recess 212 in its underside. There is also provided a spider 214 which may be retained in position by a press-fit ring 216, and helical spring 218 resting on spider 214 and entering recess 212 to normally bias the gear disc 208 away from the cooperating surfaces of guide ring 204. The downstream end of the casing 200 is provided with a screen 220 retained in position by annular cap 222. Appropriate gaskets 224 and 226 are also provided.

In FIGURE 22, the aerator of FIGURE 21 is provided with a flexible hose or conduit 228 at its discharge end for providing means for directing the aerated stream in any direction as desired. The flexible hose is of well known construction including a sheath 230 of flexible material wrapped around a helical wire coil 232. The flexible hose 228 is secured by any appropriate bonding means to cap 222, as shown, and the outlet end of the hose 228 may be provided with a discharge nozzle 234. The aerator of FIGURE 22 is further provided with a stop-washer 235 having a plurality of inwardly extending arms 237 spaced above and overlying the plug member 206. The stop-washer 235 prevents the plug member 206 from falling out when the aerator is used in a horizontal or inverted position. The stop-washer 235 is also adapted to engage the plug member 206 when the spring 218 pushes the plug member away from its operating position within guide ring 204, and stop-washer 235 thus acts to limit, or stop, the motion of plug member 206. An appropriate sealing gasket, or washer, 236 is provided.

The aerator described herein may be used domestically in kitchens and bathrooms and may also be used industrially for use with machine tool coolants. The self-cleaning aerator of FIGURE 21 has been found to be particularly successful in aerating recirculating machine tool coolants without clogging thereof by the dirt and debris suspended in the coolant.

Thus, the self-cleaning aerator as described herein may be used for any household or industrial application, where it is desired to obtain either an aerated and/or a non-splash flow of liquid, which liquid might normally contain either particles, or sediment, or perhaps other foreign matter. In industrial applications, the non-splash fluid obtains a better wetting action, and thus is used wherever it is desired to cool or wash any material.

The aerators can also be used for aerating liquid comestibles, such as thawed out frozen fruit juices, for the purpose of enhancing the flavor thereof by restoring a more normal flavor thereto by incorporating air into the liquid comestible that is processed through the aerator.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States is:

1. A liquid aerator comprising, in combination: a tubular barrel having its upstream end adapted for connection to a supply of liquid under pressure and having lateral air inlets therein; an annular ring in said barrel extending inwardly from the inner wall of said barrel and providing an inner ring surface which includes an upstream cylindrical surface portion, and a flow-directing conical surface portion located downstream of said cylindrical surface portion and being sloped to converge downstream, and the greatest diameter of said conical surface portion being no greater than the diameter of said cylindrical surface portion; a plug member movably arranged relative to said annular ring and comprising a cylindrical liquid-dividing disc and a splash member, said cylindrical liquid-dividing disc having a plurality of axially extending grooves formed in the periphery thereof, the maximum diameter of said cylindrical disc being substantially the same as the diameter of said cylindrical surface portion, so that said ring and grooved disc are adapted to cooperate to define therebetween a plurality of axially extending flow passageways, said conical surface portion being positioned to receive and to turn and direct the flow of liquid issuing from said flow passageways for movement downstream along said conical surface portion, said splash member being located downstream of said conical surface portion and positioned to have the liquid, which is directed by said converging conical surface portion, directed thereagainst to effect break-up of said liquid within said barrel and to cause aeration of said liquid within said barrel with air aspirated thereinto through said air inlets; and resilient means engaging said plug member and urging said plug member upstream, relative to said annular ring, against the force exerted on said plug member by the liquid passing through aerator, to expose the portions of said annular ring and liquid-dividing disc, which are adapted to cooperate to define said flow passageways, to flushing action by liquid passing through the aerator.

2. A liquid aerator as set forth in claim 1 wherein said resilient means includes a cantilever-type leaf spring anchored adjacent its fixed end relative to said annular ring and engaging said plug member adjacent the free end of said cantilever.

References Cited in the file of this patent

UNITED STATES PATENTS

| | | |
|---|---|---|
| 1,630,835 | Doyle | May 31, 1927 |
| 2,140,838 | Hart | Dec. 20, 1938 |
| 2,210,846 | Aghnides | Aug. 6, 1940 |
| 2,299,852 | Shaner et al. | Oct. 27, 1942 |
| 2,423,960 | Bucknell et al. | July 15, 1947 |
| 2,565,554 | Goodrie | Aug. 28, 1951 |
| 2,583,232 | Russell | Jan. 22, 1952 |
| 2,583,234 | Russell et al. | Jan. 22, 1952 |
| 2,633,343 | Aghnides | Mar. 31, 1953 |
| 2,643,104 | Holden | June 23, 1953 |
| 2,653,517 | Pigott | Sept. 29, 1953 |
| 2,675,218 | Bletcher et al. | Apr. 13, 1954 |
| 2,680,649 | Hansen | June 8, 1954 |
| 2,688,515 | Filliung | Sept. 7, 1954 |
| 2,707,624 | Shames et al. | May 3, 1955 |

FOREIGN PATENTS

| | | |
|---|---|---|
| 698,691 | Great Britain | Oct. 21, 1953 |
| 1,000,443 | France | 1954 |